Patented Mar. 14, 1950

2,500,678

UNITED STATES PATENT OFFICE 2,500,678

CARROTING SOLUTION

Kenneth J. Hassan, Danbury, Conn.

No Drawing. Application April 13, 1946,
Serial No. 662,098

5 Claims. (Cl. 8—112)

This invention relates to the chemical treatment of fur and other animal fibers in order to give them suitable felting properties. In the fur cutting and hat industry this chemical process is called carroting. It is a well known fact that without such a chemical treatment or carroting, that is, fur in its natural state, lacks adequate felting properties vitally necessary in the manufacture of felt hats.

In order that this invention be fully understood, it is necessary to explain in detail the mechanics of carroting. Moreover, it is also desirable to enumerate some of the chemicals in common use for this purpose.

Carroting has been employed in the hat industry for a long time, and by it is understood the imparting of felting properties to rabbit, hare, beaver, muskrat and other furs. In their natural state the above mentioned furs have very little or no felting properties of any commercial value. In order to give these furs suitable felting properties, they must be subjected to a chemical treatment called carroting. The procedure commonly adopted is to first clean the skins thoroughly, that is, remove all blood, dirt and excess grease by drumming them with sawdust, fuller's earth, carbon tetrachloride, or any other cleaning agent and grease solvent. After cleaning, some skins are clipped to remove excess hairs. Then the skins are ready to be carroted, which consists of applying the carroting solution to the fur of the skin by brushing, spraying or any other method of application. The skins are then allowed to remain stacked fur to fur for a predetermined length of time so as to allow the chemicals to react with the fur fibers. After this reaction period, the skins are spread and dried either naturally or at a definite elevated temperature. This time may vary anywhere from about 15 minutes to 8 or 12 hours, depending on the type of drying and the nature of the drying conditions.

After drying, the skins are ready for conditioning, so that they may regain their natural moisture content. They are then brushed and cut. The fur may be stored and aged, or used immediately, depending on the type of carroting solution employed.

The oldest and most commonly known carroting solution is the mercury carrot; this being a combination of nitrate of mercury and nitric acid. In order to derive the full benefit from this carroting solution, it is very important that the fur be aged after carroting, either on the skin or after it has been cut. This period of aging may extend over weeks or months, and the longer the storage time the better the shrinkage or felting qualities of the fur and the resulting felt.

The combination of nitrate of mercury with nitric acid is the best known and the oldest reagent used in carroting. More recently such non- mercuric reagents as chloric acid, sulfuric acid and hydrogen peroxide, nitric acid with hydrogen peroxide, as well as these reagents with various stabilizers, anti-oxidants, and buffer salts have been used in carroting. Another commonly used carroting solution consists of nitric acid, nitrate of mercury and hydrogen peroxide. There have been numerous patents granted covering these various combinations, as well as others not in common use.

From this description of the carroting operation it will be clear it is very important that the chemicals employed be free from toxic effects, so that they can be safely handled. It is also very important that the reaction on the fur fibers cease as soon as the fur is dry, or that the active reagents be volatile, so as to be removed during the drying operation. If this is not the case the fur might suffer through further chemical reaction while in storage.

It is very important that fur should be subject to a rigid control in shrinkage and felting, and this should result directly through the use of various strengths of carroting solutions, together with control of the actual carroting and drying operations. Then, too, carroted fur is evaluated by the amount of filler stock it will absorb in its felting process without wasting away or extending the felting period beyond a reasonable commercial time limit.

It is an object of this invention to produce fur resulting in strong and tight felt having little or no discoloration and capable of being dyed uniformly without any background or mottle, also to be stored indefinitely without any deterioration of fibers, but rather to improve upon aging.

Another object is to provide a carroting solution with low concentration of acid, as this allows the fur to retain its weight in the final felt much better than when high concentrations of acids are used. It also reduces wasting away of the felt and consequent loss of weight during subsequent processing, and further aids in obtaining clear and bright colors in dyeing.

It is also an object to produce a carroting solution free from toxic effects so that it can be safely handled.

A further object is the production of a carroting solution which is practically inactive at low temperatures or the temperature of application, but which action will increase on heating, so that no reaction on the fibers will occur until the drying operation where it may be properly controlled.

It is another object to provide a carroting solution with which the reaction on the fur fibers will cease as soon as the fur is dry.

It is a further object to provide a carroting solution in the use of which the fur may be readily and effectively subject to rigid control in shrinkage and felting properties through the use of various strengths of carroting solutions, together with control of the actual carroting and drying operations.

In carrying out these objects and effects, this invention makes use of very novel combinations of chemicals in carroting fur, known as nitrohydroxy derivatives. These nitrohydroxy compounds are formed by condensation of one or more of the nitroparaffins, such, for example, as nitromethane, nitroethane, 1-nitropropane, 2-nitropropane and the like, with aldehydes. These chemical compounds in general are weakly acid in reaction, and have a mild oxidizing action at low temperatures, but which increases upon heating. This property is very desirable, since in the carroting of skins no reaction on the fur fiber is wanted until the skin reaches the drying operation, which can be easily controlled as to intensity and time. By the proper application and control of humidity in drying, the length of time, and various degrees of temperature, various degrees of carroting may be imparted to the fur fibers. As the present time there are five nitrohydroxy derivatives available in commercial quantities and each of these has a different reaction speed, and reacts more or less at various temperatures in the presence of other chemical ingredients, or if used in combination with one another.

It has been determined that these nitrohydroxy derivatives are nontoxic with adequate ventilation and are harmless to the skin under ordinary conditions of use.

The nitrohydroxy derivatives used in my experiments, and the only ones at present available in commercial quantities, are:

A.—2-nitro-1-butanol ($CH_3CH_2CHNO_2CH_2OH$)

B.—2-nitro-2-methyl-1-propanol $(CH_3C(CH_3)NO_2CH_2OH)$

C.—2-nitro-2-methyl-1,3 propanediol $(CH_2OHC(CH_3)NO_2CH_2OH)$

D.—2-nitro-2-ethyl-1,3 propanediol $(CH_2OHC(C_2H_5)NO_2CH_2OH)$

E.—Tris(hydroxymethyl) nitromethane $(CH_2OHC(CH_2OH)NO_2CH_2OH)$

For the sake of simplicity, the term "nitrohydroxy derivatives" will be abbreviated to "N-H-D," and the five noted will be called by the letters assigned to them, that is, A, B, C, D and E.

The nitrohydroxy derivatives may be used in combination with acids, in combination with other oxidizers, or in combination with both additional oxidizers and acids. Since carroting requires a rapid controlled reaction, and since the three nitrohydroxy derivatives, C, D and E, are more reactive and soluble at higher temperatures than A and B, my research has been centered on the three, C, D and E. While A and B have carroting effects, A is not practical because it is not readily soluble in water at the usual carroting temperatures or concentrations. B is more practical as it is soluble at the usual carroting temperatures, but C, D and E are most practical for purposes of this invention as they are readily soluble and decompose at higher temperatures or their boiling temperatures.

As an example, I have used C, D and E in acid solutions, using high temperatures in drying, and have obtained greatly improved carroting reaction on fur fibers over the commonly used carroting solutions.

In order to get sufficient oxidizing reaction at lower temperatures, I have used these nitrohydroxy derivatives with nitric acid at various concentrations.

Also, in order to increase the speed of chemical reaction at lower temperatures, I have used additional oxidizing agents, such, for example, as persulfates, perchromates, and peroxides.

The use of these compounds is not confined to nitric acid, as I have also made use of other acids such as hydrochloric, phosphoric, acetic, formic, and so forth, so as to increase the acidity of the nitrohydroxy derivative, but nitric acid is preferred. The acids used, however, should be volatile so that the solution will dry or evaporate so as to be removed during the drying operation, and the reaction on the fur fibers will cease as soon as the fur is dry.

I have also found that combinations of one or more of the nitrohydroxy derivatives with acids and an additional oxidizer produces satisfactory results.

Some of the nitrohydroxy derivatives are very active oxidizing agents, especially in the presence of acids, and particularly nitric acid. The oxidizing and carroting reaction can be fully controlled by temperature. At low temperature the reaction is very gentle, but as the temperature is raised the nitrohydroxy derivatives become very reactive, which imparts the carroting action on the fur fiber. At such temperatures as 220–250 degrees F., the reaction is almost violent, as these reagents decompose.

Other advantages are, by using the nitrohydroxy derivatives it is possible to make use of very low concentrations of acids. This is a decided advantage over other carroting solutions, since a high acidity has a very destructive action upon the fur fiber, especially during the piling or stacking of the skins after carroting previous to drying. A low acid concentration also permits the use of high drying temperatures of 180°–220° F. or infra red drying with proper air circulation at 240°–350° F. Furthermore, by the use of a low concentration of acid it has been found that the fur retains its weight in the final felt much better than when high concentrations of acids are used. It seems to prevent wasting away of felt and consequent loss of weight in processing.

A study of the various reactions shows that a wide variation of concentrations and combinations of the various chemicals mentioned in the above tabulation may be used, and for this reason, some typical formulae of carroting solutions are indicated as follows (the proportions being given by weight):

(1) 2–10% tris (hydroxymethyl) nitromethane
    2% hydrochloric acid, 20° Bé.
    4% nitric acid, 40° Bé.
    Dissolved in water to 100%

(2) 2–10% tris (hydroxymethyl) nitromethane
    5–10% nitric acid conc., 40° Bé.
    Dissolved in water to 100%

(3) 2–10% 2-nitro-2-ethyl-1,3 propanediol
    2% hydrochloric acid, 20° Bé.
    4% nitric acid, 40° Bé.
    Dissolved in water to 100%

(4) 2–10% 2-nitro-2-methyl-1,3 propanediol
    2–10% 2-nitro-2-ethyl-1,3 propanediol
    5–8% hydrochloric acid con., 20° Bé.
    Dissolved in water to 100%

(5) 2–10% tris (hydroxymethyl) nitromethane
2–10% 2-nitro-2-methyl-1,3 propanediol
4–8% nitric acid conc., 40° Bé.
2–5% potassium persulphate
Dissolved in water to 100%

(6) 2–10% tris (hydroxysulphyl) nitromethane
4–8% nitric acid conc., 40° Bé.
2–5% hydrogen peroxide 100 vol. (30%)
Dissolved in water to 100%

The above examples are progressively better in felting effect, but, as stated, these are given merely by way of example, and the carroting solutions are not limited to these specific proportions, the range of acids may be from about 5–30%, and the nitrohydroxy derivatives from 1–15% in the aqueous solution. Where hydrogen peroxide is used, the range of nitrohydroxy derivatives may be from 1 to 10%, with the peroxide from 1 to 20%, with the acids kept the same, from 5 to 30%. Specific solutions which have been found to be very good carroting solutions are as follows (the quantities being given by weight):

12%—nitrohydroxy derivative
10%—nitric acid, 40° Bé.
78%—water

15%—nitrohydroxy derivative
10%—hydrogen peroxide, 100 vol.
75%—water

12%—hydrochloric acid, 20° Bé.
8%—nitrohydroxy derivative
5%—hydrogen peroxide, 100 vol.
75%—water 8%—nitric acid, 40° Bé.
2%—hydrochloric acid, 20° Bé.
10%—nitrohydroxy derivatives
5%—hydrogen peroxide, 100 vol.
75%—water As above stated, each of the nitrohydroxy derivatives mentioned when used as designated have fur carroting effect, but the last three, designated C, D and E, which decompose above boiling point of 10 mm. at about 100° C., have the greatest carroting effect and are preferred. Apparently when they dry on the skin it is possible they may decompose to react on the fur fibers. At any rate, they have been found to have a better carroting action than those which do not show this characteristic.

When these nitrohydroxy compounds are used in solution with hydrogen peroxide, while the peroxide is an oxidizer, it is used here more as a bleaching agent. The acid (particularly nitric acid) and others may stain the fur to a certain extent, and the peroxide will bleach it.

As volatile type acids are used, or that is, acids which volatilize or are driven off with the water as they dry, they dry out or evaporate as the solution dries, and as the nitrohydroxy derivative decomposes, the carroting action or the chemical reaction on the fur fibers ceases as soon as the fur is drying during the drying operation. Non-volatile acids get progressively more concentrated as they dry, and stay on or in the fiber so that they destroy it chemically.

Having thus set forth the nature of my invention, I claim:

1. The process of preparing fur for felting comprising subjecting the fur to the chemical action of an aqueous solution, comprising as active carroting ingredients 1 to 15% nitrohydroxy derivative selected from the group consisting of 2-nitro-2-methyl-1-propanol,
2-nitro-2-methyl-1,3 propanediol,
2-nitro-2-ethyl-1,3 propanediol, and
Tris (hydroxymethyl) nitromethane, and 5 to 30% volatile acid selected from the group consisting of nitric, hydrochloric, acetic and formic acid.

2. The process of preparing fur for felting comprising subjecting the fur to the chemical action of an aqueous solution, comprising as active carroting ingredients 1 to 10% nitrohydroxy derivative selected from the group consisting of 2-nitro-2-methyl-1-propanol,
2-nitro-2-methyl-1,3 propanediol,
2-nitro-2-ethyl-1,3 propanediol, and
Tris (hydroxymethyl) nitromethane, 5 to 30% volatile acid selected from the group consisting of nitric, hydrochloric, acetic and formic acid, and 1 to 20% hydrogen peroxide.

3. The process of preparing fur for felting comprising subjecting the fur to the chemical action of an aqueous solution, comprising as active carroting ingredients 1 to 10% nitrohydroxy derivative, selected from the group consisting of 2-nitro-2-methyl-1-propanol,
2-nitro-2-methyl-1,3 propanediol,
2-nitro-2-ethyl-1,3 propanediol, and
Tris (hydroxymethyl) nitromethane, 5 to 30% nitric acid and 1 to 20% hydrogen peroxide.

4. An aqueous carroting solution for treating fur comprising as active carroting ingredients 1 to 10% nitrohydroxy derivative selected from the group consisting of 2-nitro-2-methyl-1-propanol,
2-nitro-2-methyl-1,3 propanediol,
2-nitro-2-ethyl-1,3 propanediol, and
Tris (hydroxymethyl) nitromethane, 5 to 30% volatile acid selected from the group consisting of nitric, hydrochloric, acetic and formic acid, and 1 to 20% hydrogen peroxide.

5. An aqueous carroting solution for treating fur comprising as active carroting ingredients 1 to 10% nitrohydroxy derivative selected from the group consisting of 2-nitro-2-methyl-1-propanol,
2-nitro-2-methyl-1,3 propanediol,
2-nitro-2-ethyl-1,3 propanediol, and
Tris (hydroxymethyl) nitromethane, 5 to 30% nitric acid, and 1 to 20% hydrogen peroxide.

KENNETH J. HASSAN.

REFERENCES CITED

The following references are of record in the file of this patent:

UNITED STATES PATENTS

| Number | Name | Date |
|---|---|---|
| 2,231,403 | Wyler | Feb. 11, 1941 |
| 2,300,660 | Fabian | Nov. 3, 1942 |

OTHER REFERENCES

Gabriel: "The nitroparaffins," Ind. Eng. Chem., 1940, pages 887–892; pages 890–891 esp. pertinent.

Beilstein: "Handbuch . . ." 4th ed., vol. 1, pages 370, 373, 378, 480, 482, 483, 520; first supplement, vol. 1, page 276.